D. CAVE.
SPRING WHEEL.
APPLICATION FILED APR. 25, 1914.

1,158,373.

Patented Oct. 26, 1915.

Witnesses
E. R. Ruppert
R. M. Smith

Inventor
Daniel Cave
By Victor J. Evans
Attorney

UNITED STATES PATENT OFFICE.

DANIEL CAVE, OF LINCOLN, NEBRASKA, ASSIGNOR OF ONE-THIRD TO HAROLD M. GEORGE AND ONE-THIRD TO HENRY BOWMAN, BOTH OF LINCOLN, NEBRASKA.

SPRING-WHEEL.

1,158,373.      Specification of Letters Patent.      Patented Oct. 26, 1915.

Application filed April 25, 1914. Serial No. 834,423.

*To all whom it may concern:*

Be it known that I, DANIEL CAVE, a citizen of the United States, residing at 821 South Fifteenth street, Lincoln, in the county of Lancaster and State of Nebraska, have invented new and useful Improvements in Spring-Wheels, of which the following is a specification.

This invention relates to spring wheels, the broad object of the invention being to produce a wheel in which the connection between the hub and felly is composed of springs of novel construction and arrangement which operate to absorb all jars and road shocks and prevent the transmission of the same to the body of the vehicle and the passengers, at the same time doing away with the usual expensive and troublesome pneumatic tires without sacrificing any of the advantages of the last named tires.

With the above and other objects in view, the invention consists in the novel construction, combination and arrangement of parts, as will be hereinafter more fully described, illustrated and claimed.

Figure 1:
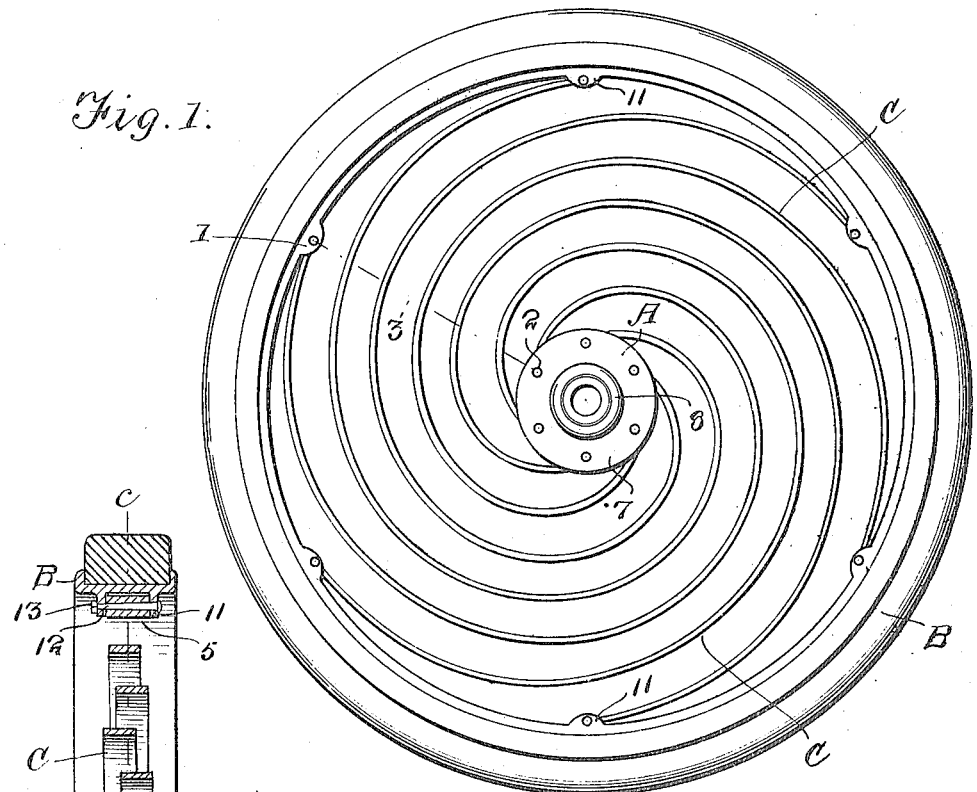
Figure 2:
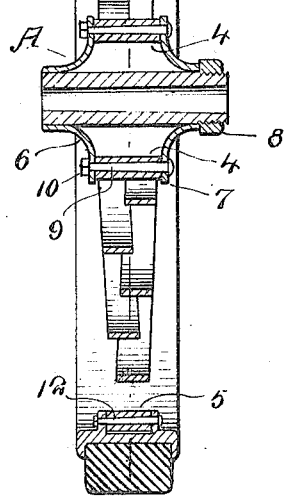
Figure 3:
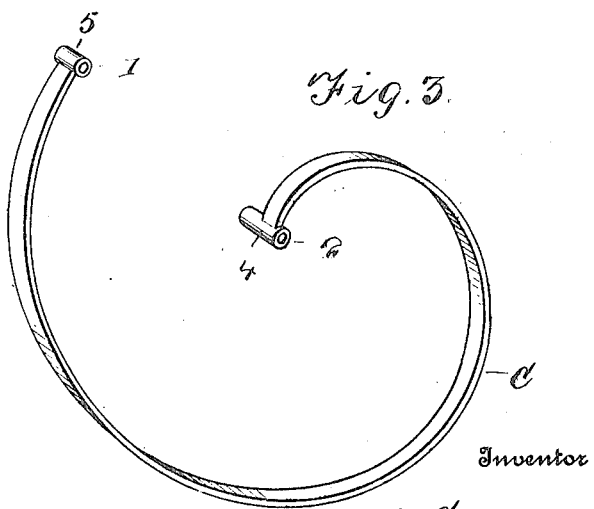

In the accompanying drawings: Figure 1 is a side elevation of a spring wheel embodying the present invention. Fig. 2 is a diametrical section through the same. Fig. 3 is a detail perspective view of one of the springs detached.

The spring wheel contemplated in this invention comprises a hub A, a felly B and a series of involute springs C which are used in lieu of the usual connecting spokes between the hub and felly. Each of the springs C is in the form of an involute coil and sweeps through an entire circle, each of said springs C being connected to the rim or felly B at the point 1 and being connected to the hub A at the point 2, it being noted that the points of attachment 1 and 2, in the preferred embodiment of this invention, lie in a common line 3 which is radial to the center of the wheel as shown in Fig. 1. It is an essential feature of this invention that each spring C sweeps at least once entirely around the hub A or, in other words, entirely around the space within the felly B as otherwise the full resilient action necessary will not be obtained. By passing each spring at least once entirely around the hub, the full resiliency of each spring will be obtained and furthermore all of the springs will contribute and mutually assist each other in yieldingly supporting the hub within the felly or conversely of the felly around the hub.

Referring now to Fig. 2 it will be observed that each of the springs C is laterally inclined or oblique with respect to an imaginary line passing centrally through the hub and felly as indicated by the lines *c, d*. This oblique or laterally inclined disposition of each spoke assists in the lateral bracing of the wheel as a whole and prevents the lateral breaking down or collapse of the wheel, each of the springs C being relatively wide as shown in Figs. 2 and 3. It will also be observed in Fig. 2 that each spring is provided at its inner end with a knuckle 4 and at its outer end with a knuckle 5, the knuckle 4 being confined between a fixed flange 6 of the hub A and a separable flange 7 usually secured in place by a nut 8 or its equivalent screwing on the main body of the hub A. The knuckle 4 is secured by means of a tapering key or bolt 9 having a retaining nut 10 on its smaller end. The knuckle 5 at the outer end of each spoke is confined between the lugs or ears 11 on the rim or felly B and secured by a tapering bolt, pin or key 12 on the smaller end of which is a retaining nut 13. It is also desired to use compression grease cups in connection with each of the knuckles 4 and 5 so as to constantly and automatically lubricate the joints between the outer extremities of the springs and the felly and the inner extremities of said springs and hub thus producing a quiet running and highly resilient wheel.

The shape and arrangement of the springs as herein set forth affords a maximum amount of resiliency and freedom of movement in any and all directions in which said movement is desirable while strengthening the wheel laterally so as to enable it to effectively sustain end thrusts of the axles of the wheels. Furthermore the springs may not touch each other no matter how great the shocks to which the wheels may be subjected, this being due to the particular shape and relative arrangement of the springs. It will also be observed that as one end portion of each spring closes under a blow imparted to the wheel, the opposite end portion of the spring opens so that a double action of each spring is obtained under each and every impact or blow and the strain is distributed throughout the entire series of springs. The construction of the wheel is also exceedingly light and strong and the cost of manufacture is reduced to a minimum. The number of springs may be increased or diminished in accordance with the stresses to be placed upon the wheel thus adapting the wheel to any kind or weight of vehicle. The knuckles at the inner extremities of the springs are of greater length than the knuckles at the outer extremities thereof and furthermore, the inner series of knuckles project to a greater extent at one side of the springs than at the other side thereof and it will also be noted that the springs are so arranged as to incline alternately to opposite sides laterally with respect to the wheel so that the inner knuckle of one spring projects at one side and the knuckle of the next adjacent spring projects at the opposite side. By means of this arrangement of the springs and knuckles, only a single annular series of bolts is required to connect the inner extremities of the springs to the hub and all of said knuckles are arranged in a common vertical plane.

What I claim is:—

A spring wheel comprising a hub, a felly, and a circular series of involute springs of uniform width terminally attached thereto and forming spokes between said hub and felly, each of said springs extending entirely around the hub and being inclined laterally with respect to a line passing centrally through the hub and felly, knuckles at the outer extremities of said springs, knuckles of greater length at the inner extremities of said springs, the last named knuckles having a greater projection at one side of their springs than at the other side thereof, and the springs being arranged to incline alternately in opposite directions, and a single annular series of bolts all arranged in the same vertical plane and connecting the inner knuckles to the hub.

In testimony whereof I affix my signature in presence of two witnesses.

DANIEL CAVE.

Witnesses:
  LILLIE BOWMAN,
  J. W. HARGREAVES.